3,422,066
POLYURETHANE FIBERS
J. W. Britain, New Martinsville, W. Va., assignor to Mobay Chemical Company, Pittsburgh, Pa., a corporation of Delaware
No Drawing. Filed Oct. 23, 1965, Ser. No. 504,129
U.S. Cl. 260—47      3 Claims
Int. Cl. C08g 22/10; C08g 22/14

ABSTRACT OF THE DISCLOSURE

Thread forming polyurethane polymers based on a hydroxyl polyester having a molecular weight of at least about 600 which has been prepared from at least 2 saturated aliphatic glycols having 2 primary hydroxyl groups and from 2 to 6 carbon atoms and an aliphatic dicarboxylic acid having from about 2 to 10 carbon atoms and certain aromatic diisocyanates which are chain-extended with a mixture of an aliphatic glycol having 2 to 10 carbon atoms and bis-(beta-hydroxy ethyl)-hydroquinone ether, para-xylylene glycol or bis-(beta-hydroxy ethyl) resorcinol ether in such amounts that from 10 to 30% by weight of the groups in the polyurethane polymer resulting from the chain-extender are derived from the primary straight chain aliphatic glycol and the balance are derived from the other chain-extender. The polyurethane polymers combine high heat distortion temperature with high melt strength and high tensile strength.

---

This invention relates to polyurethanes and more particularly to polyurethanes which have improved heat distortion temperature and simultaneously high melt strength and high tensile strength.

The preparation of polyurethanes suitable for subsequent extrusion and drawing of threads is becoming a highly developed art. It has become well known that in order to produce satisfactory polyurethane fibers they must have both hard segments and soft segments. The production of the desired segment has been accomplished in the past by several techniques. Thus, it is known to incorporate the so-called soft segment with a relatively high molecular weight polyester or polyether of low crystallinity in conjunction with a polyester or polyether having high crystallinity. Still another method is to combine a low crystallinity polyester or polyether and urea or urethane group which form the hard segments of the polymer. The most satisfactory heretofore known method of providing polyurethane polymers containing both hard and soft segments is to form polyurethane polymers from hydroxyl polyesters which have been prepared by reacting a dicarboxylic acid with a mixture of two or more saturated aliphatic glycols and an aromatic diisocyanate in order to prepare a prepolymer and reacting the prepolymer with a low molecular weight aliphatic glycol either simultaneously with the preparation of the polymer from the polyester or diisocyanate or subsequently thereto. This simplified method of preparing thread forming polyurethane polymers suffers from the disadvantage, however that the resulting polymer has a heat distortion temperature which is unsatisfactory for many uses of the threads.

It is therefore an object of this invention to provide improved thread forming polyurethanes. Another object of this invention is to provide polyurethanes having improved properties. Still a further object of this invention is to provide polyurethanes adapted to be formed into threads which have at the same time high melt strength, high tensile strength and a high heat distortion temperature. Another object of this invention is to provide an improved chain extension mixture for the preparation of polyurethanes suitable to provide improved polyurethane threads.

The foregoing objects and others will become apparent from the following description and are accomplished in accordance with the invention, generally speaking, by providing thread-forming polyurethanes having structural units represented by the formula

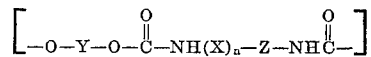

wherein O—Y—O is a bi-valent radical resulting from removal of the terminal hydrogen atoms of an hydroxyl polyester having a molecular weight of at least about 600 and prepared by reacting a mixture of two or more saturated aliphatic glycols having primary hydroxyl groups and from 2 to 6 carbon atoms in the chain between hydroxyl groups with an aliphatic dicarboxylic acid having 4 to 10 carbon atoms. X is a radical having the formula

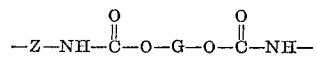

wherein Z is an aromatic radical obtained by the removal of the —NCO groups from an organic diisocyanate which is 4,4'-diphenylmethane diisocyanate, 1,5-naphthalene diisocyanate, meta-phenylene diisocyanate or para-phenylene diisocyanate and O—G—O is a bivalent radical resulting from removal of the terminal hydrogen atoms from a glycol, from about 10% by weight to about 30% by weight of the radical O—G—O being derived from a primary straight chain glycol having 2 to 10 carbon atoms between hydroxyl groups and from about 70% to about 90% by weight of the radical O—G—O being derived from an aromatic glycol which is bis-(beta-hydroxy ethyl ether) hydroquinone, para-xylylene glycol, or bis-(beta-hydroxy ethyl ether) resorcinol and $n$ is an integer of at least 2. Thus, the invention contemplates a segmented polyurethane polymer prepared from specific polyesters with specific aromatic diisocyanates and a mixture of primary glycols where the ratio of molecules of primary glycol to molecules of polyester employed in preparing the polyurethane by reaction with the specified aromatic diisocyanates is at least 2.

The polyester represented by Y in the foregoing formula is of low crystallinity and has a molecular weight at least about 600 and preferably from about 600 to about 5000. It is prepared from a mixture of at least two saturated aliphatic glycols having primary hydroxyl groups and from 2 to 6 carbon atoms in the chain between hydroxyl groups such as, for example, ethylene glycol, 1,3-propane diol, 2,2-dimethyl propane-1,3-diol, 2,2-diethyl propane-1,3-diol, 2-ethyl-2-butyl-1,3-propane diol, 1,4-butane diol, 1,5-pentane diol, 1,6-hexane diol, 2,4-cyclohexane dimethylol and the like; and one or more aliphatic dicarboxylic acids having from 4 to 10 carbon atoms such as, for example, succinic acid, glutaric acid, adipic acid, pimelic acid, suberic acid, azelaic acid, sebacic acid and the like. For best results, a polyester having the molecular weight of from about 1500 to about 3500 is preferred. The preferred polyester is one based on ethylene glycol, 1,4-butane diol and adipic acid. The polyesters are prepared in such proportions that there is an excess of hydroxyl groups resulting in an hydroxyl polyester. The hydroxyl polyester preferably has an hydroxyl number of from about 20 to about 190 and an acid number below about 2.

The radical represented by G in the foregoing formula is a bi-valent radical obtained by the removal of the terminal hydrogen atoms from the glycol which is either of the aliphatic type or the aromatic type set forth above. The aliphatic type of glycol chain extender which results in the radical G in the foregoing formula may be any suitable primary straight chain glycol having from 2 to 10 carbon atoms and preferably 2 to 6 carbon atoms in the chain between hydroxyl groups, such as, for example, 1,4-butane diol, 1,6-hexane diol, 1,3-propane diol, ethylene glycol, 1,5-pentane diol, 1,7-heptane diol, 1,8-octane diol, 1,9-nonane diol, and 1,10-decane diol. It is preferred that the aliphatic glycol have from 2 to 6 carbon atoms and no branches in the chain.

In accordance with a preferred embodiment of the invention, the ratio of all of the glycol molecules which are present to all of the polyester molecules is at least 2 and preferably from 2 to 8 and most preferably from about 3 to 5. Furthermore, it is preferred that the polyester represented by Y have a molecular weight of about 2500 and Z an aromatic radical obtained by removal of the NCO groups from 4,4'-diphenyl methane diisocyanate, and that the aliphatic radical represented by G is derived from 1,4-butane diol and bis-(beta-hydroxy ethyl) hydroquinone ether while $n$ has a value of 4.

The thread-forming polyurethane polymers of this invention are prepared by relatively simple techniques. One may react the hydroxyl polyester with a sufficient excess of the aromatic diisocyanate to provide a polyester having free NCO groups and then add the chain extending agents represented by G in the foregoing formula either simultaneously or sequentially to obtain the desired molecular weight of the hard segment X. Alternately, one may mix all of one or the other or both of the glycol chain extenders with the polyester and the aromatic diisocyanate in a single step and in such proportions that the final NCO to OH ratio is from 1.02 to 1.15. The combined components may be cast in a mold at a temperature preferably from about 80 to about 135° C. for a short time preferably from 8 to 30 minutes and then permitted to cool to room temperature where solidification results. Alternately, one may add all of the components directly to a feed section of an extruder and extrude the resulting solidifying mixture into strands which are drawn into the desired polyurethane threads immediately. Still further, it is possible to re-extrude chopped pellets of an initial extrudate in order to prepare a thread of ultimate desired denier. If the polyurethane from the components are prepared by casting in a mold and cooling to room temperature, they are chopped or ground to a size suitable for feeding to an extruder and then threads are formed by extruding the polyurethane through a die and drawing it down to the desired denier.

It is also preferred to include a catalytic amount of a suitable catalyst in the reaction mixture, for example, ferric acetyl acetonate. The amount of catalyst is preferably from about 0.01% to 0.10% by weight of the total chain extender used, most preferably about 0.03% by weight.

The advantage of the invention over the heretofore known polymers based only on aliphatic diols as the chain extender is that the heat distortion temperature is vastly increased. It must be pointed out, however, that the heat distortion temperature could be increased by replacing all of the aliphatic diols with the aromatic glycol. However, those polymers which are chain extended with only the aromatic glycol have low tensile strength and low melt strength and hence cannot be drawn into fine fibers in the melted state. It is therefore necessary and an essential element of this invention that from about 10 to 30% by weight of the chain extender be of the aliphatic type while from about 70 to 90% by weight of the chain extender is of the aromatic type. Surprisingly, when as little as 70% of the chain extender is of the aromatic type, the heat distortion temperature is retained up to about 150 to about 160° C. and the tensile strength as well as the melt strength is hardly diminished even with only 10% of the butane diol. Therefore, the present invention provides for a unique combination of aliphatic glycol chain extenders and aromatic glycol chain extenders of the particular types set forth above which provide for simultaneous high tensile strength, high melt strength and a high heat distortion temperature. High melt strengths are necessary so that the polymers can be drawn down in the melted state to fine denier without breaking to make a continuously spun spool of unbroken fibers. Low melt strength polymers are not suitable for fiber production by melt spinning. High tensile strength of the finished fiber is desirable so that fine denier fibers can be used for high strength, thus requiring less weight of polyurethane fiber and hence less cost. Threads should have high heat distortion temperatures because when they are used in the production of elastic fabrics, temperatures of 100 to 140° C. are used in certain of the fabric finishing steps. These temperatures cause low heat distortion temperature threads to relax and elongate to take on permanent set and there is little or no tension remaining in the fabric due to the relaxed polyurethane elastic fibers.

The threads resulting from the polyurethanes of the present invention are useful in the areas where these threads have been used heretofore, for example, for the preparation of elastic hose, undergarments and the like.

The improved heat distortion property of the polymers of the present invention is apparent from the following table:

| Temperature (° C.) | Percent elongation | | |
| --- | --- | --- | --- |
| | A | B | C |
| 120 | 0 | 0 | 0 |
| 130 | 10 | 0 | 10 |
| 140 | 10 | 5 | 65 |
| 150 | 50 | 45 | 375 |

In the foregoing table, A is prepared according to Example 1 of the working examples below and has excellent tensile strength; B is prepared according to Example 2 of the working examples below (note that the tensile strength of this polymer is unsatisfactory) and C is prepared according to Example 3 of the working examples below.

The invention is further illustrated by the following examples in which parts are by weight unless otherwise specified.

Example 1

About 1000 parts of an hydroxyl polyester having a molecular weight of about 2000, an hydroxyl number of about 56, an acid number of about 0.2 and a water content of about 0.01% by weight prepared by reacting about one mol of ethylene glycol, about one mol of 1,4-butane diol and about 1.6 mols of adipic acid are added to about 116.2 parts of para-xylylene diol and about 34.5 parts of 1,4-butane diol. The resulting mixture of polyester and diols is heated and mixed at about 120° C. and then about 450 parts of 4,4'-diphenylmethane diisocyanate which has been preheated to about 100° C. are added and mixed thoroughly for about 20 seconds and then cast into a shallow polypropylene tray which has been coated with a silicone mold release agent. The tray is placed into a 110° C. oven and heated for about 10 minutes. The resulting polyurethane is then removed from the tray after cooling to room temperature and ground to a particle size of about ⅛ inch. The ground material is then extruded from an extruder where the rear zone is at a temperature of about 380° F. The front zone is at a temperature of about 440° F., the throat zone is at a temperature of about 450° F. and the die is at a temperature of about 465° F. Air is passed over the melted strand as it is extruded from the die. The air temperature is about 220° C. The extruded thread is drawn down from the melted strand to about a 500 denier size by passing it onto a cooling belt running at a speed of about 350 ft./min. and wound up on a spool at a rate of 370 ft./min. The melted strand had a high melt strength and could be easily drawn down to a fine denier fiber. The polymer has a hardness of about 80 Shore A. The resulting fibers were heated in a vacuum oven for about 16 hours at about 110° C. and then cooled and tested for physical properties. Tensile strength: 1 gram/denier.

Elongation: 560% at break. Break set: 8% (10 minutes after break). The fibers were insoluble in tetrahydrofuran.

Example 2

About 1000 grams of the polyester employed in Example 1 are mixed with about 169 grams of para-xylylene glycol at about 120° C. Then about 450 grams of 4,4′-diphenylmethane diisocyanate which has been preheated to about 100° C. are added to the premixed polyester and para-xylylene diol and thoroughly mixed for about 30 seconds and then cast into a silicone coated polypropylene tray. This polymer was cured in an oven at about 110° C. for about 15 minutes and then cooled to room temperature. After cooling to room temperature the polymer was ground up and extruded under the conditions set forth in Example 1. However, the polymer was found to be extremely difficult to draw down into a fiber from the melted strands and broke very easily when the attempt was made. Moreover, any other operating temperature above and below those employed in Example 1 were equally unsatisfactory and short strands of about 1000 denier were obtained which could not be drawn down by conventional processing technique. The short strands had the following properties:

Hardness, Shore A _____ 90
Tensile strength, grams/denier _____ 0.32
Elongation, percent _____ 410
Break set, percent (10 minutes after break) _____ 10

The fibers were insoluble in tetrahydrofuran.

Example 3

About 1000 parts of the polyester of Example 1 are mixed with about 110.28 grams of 1,4-butane diol at about 100° C. and then about 450 grams of 4,4′-diphenylmethane diisocyanate which has been preheated to about 100° C. are added and mixed for about 30 seconds. The reaction mixture is then cast into a polypropylene tray coated with a silicone mold release agent. The polymer is heat treated in an oven for about 15 minutes at about 110° C. It is then cooled to room temperature and ground to a particle size of about ⅛ inch. The polymer is then melt extruded as in Example 1. The strands are very easily drawn down to fine denier fibers of about 400 denier. The fibers are heat cured for about 16 hours at about 110° C. in a vacuum oven. The polymer has a hardness of 80 Shore A and the fiber has tensile strength of 1 gram/denier; elongation of 600% at break; break set of 10% (10 minutes after break). The cured fibers were insoluble in tetrahydrofuran.

Example 4

About 1000 parts of a polyester having a molecular weight of about 2000, an hydroxyl number of about 56 and an acid number of less than 2 and prepared by reacting about 1 mol of 1,6-hexane diol, about 1 mol of 1,4-butane diol and about 1.75 mols of adipic acid are mixed with about 167 parts of the bis-beta-hydroxy ethyl ether of hydroquinone and about 34.5 parts of 1,4-butane diol at about 100° C. and then about 450 parts of 4,4′-diphenylmethane diisocyanate which has been preheated to about 90° C. are added and mixed for about 20 seconds. The reaction mixture is then cast into a polypropylene tray coated with a silicone mold release agent. The polymer is then placed in an oven at about 110° C. and held at this temperature for about 50 minutes. It is then removed, cooled to room temperature and ground to a particle size of about ⅛ inch. The polymer is then extruded according to the procedure of Example 1 and can be drawn down easily to very fine denier fibers of about 400 denier which are then vacuum cured in an oven at about 110° C. for about 16 hours. The cured threads are insoluble in tetrahydrofuran. The polymer had a hardness of Shore A 90; tensile strength of 0.97 gram/denier; 480% elongation at break and a break set of 8% (10 minutes after break).

It is to be understood that the foregoing working examples are given for the purpose of illustration and that any other suitable polyester, isocyanate or mixture of chain extenders could have been used therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A thread forming polyurethane polymer consisting essentially of repeating units of the formula $$\left[-\text{O}-\text{R}-\text{O}-\overset{\text{O}}{\underset{\|}{\text{C}}}-\text{NH}(X)_n-Z-\text{N}\overset{\text{O}}{\underset{\|}{\text{H}\text{C}}}-\right]$$

wherein O—R—O is a bivalent radical resulting from removal of the terminal hydrogen atoms from an hydroxyl polyester having a molecular weight of at least about 600 and an hydroxyl number below about 190 and an acid number below about 2 prepared by a process which comprises reacting a mixture of at least two saturated aliphatic glycols having primary hydroxyl groups and from 2 to 6 carbon atoms in the chain between hydroxyl groups with an aliphatic dicarboxylic acid having from 4 to 10 carbon atoms, X is a radical having the formula $$-Z-\text{NH}-\overset{\text{O}}{\underset{\|}{\text{C}}}-\text{O}-\text{G}-\text{O}-\overset{\text{O}}{\underset{\|}{\text{C}}}-\text{NH}-$$

wherein Z is a divalent aromatic radical obtained by removing the NCO groups from 4,4′-diphenylmethane diisocyanate, 1,5-naphthalene diisocyanate, meta-phenylene diisocyanate or para-phenylene diisocyanate and O—G—O is a bivalent radical resulting from the removal of the terminal hydrogen atoms from a primary glycol and n is at least 2, with the proviso that from about 10% to about 30% by weight of the radical represented by O—G—O is derived from a primary straight chain aliphatic glycol having from 2 to 10 carbon atoms between hydroxyl groups and the balance of said radical O—G—O is derived from bis-(beta-hydroxy ethyl)-hydroquinone ether, para-xylylene glycol or bis-(beta-hydroxy ethyl)-resorcinol ether.

2. The thread forming polyurethane polymer of claim 1 wherein Z is obtained by removing the NCO groups from 4,4′-diphenylmethane diisocyanate.

3. The thread forming polyurethane polymer of claim 1 wherein said O—Y—O bivalent radical results from the removal of a polyester having a molecular weight of from about 600 to about 5000 which is based on ethylene glycol, 1,4-butane diol and adipic acid and has an hydroxyl number of from about 20 to 190 and an acid number below about 2.

References Cited

UNITED STATES PATENTS 3,012,992 12/1961 Pigott et al. _____ 260—75
3,016,364 1/1962 Müller _____ 260—47
3,296,212 1/1967 Britain _____ 260—75

WILLIAM H. SHORT, *Primary Examiner.*

L. L. LEE, *Assistant Examiner.*

U.S. Cl. X.R.

260—75